United States Patent
Murashige et al.

(10) Patent No.: US 11,926,140 B2
(45) Date of Patent: *Mar. 12, 2024

(54) GLASS ROLL WITH RESIN FILM

(71) Applicant: NITTO DENKO CORPORATION, Ibaraki (JP)

(72) Inventors: Takeshi Murashige, Ibaraki (JP); Junichi Inagaki, Ibaraki (JP); Kazuhito Hosokawa, Ibaraki (JP); Kota Nakai, Ibaraki (JP); Toshihiro Kanno, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,712

(22) Filed: Dec. 29, 2021

(65) Prior Publication Data

US 2022/0118739 A1 Apr. 21, 2022

Related U.S. Application Data

(63) Continuation of application No. 16/345,466, filed as application No. PCT/JP2017/038353 on Oct. 24, 2017, now Pat. No. 11,241,863.

(30) Foreign Application Priority Data

Oct. 26, 2016 (JP) ................................. 2016-209752

(51) Int. Cl.
*B32B 7/12* (2006.01)
*B32B 1/08* (2006.01)
(Continued)

(52) U.S. Cl.
CPC ................. *B32B 7/12* (2013.01); *B32B 1/08* (2013.01); *B32B 17/10* (2013.01); *B65H 18/28* (2013.01);
(Continued)

(58) Field of Classification Search
None
See application file for complete search history.

(56) References Cited

U.S. PATENT DOCUMENTS 4,839,400 A 6/1989 Sato et al.
8,241,751 B2 8/2012 Tomamoto et al.
(Continued)

FOREIGN PATENT DOCUMENTS

CN 102076579 A 5/2011
CN 102083712 A 6/2011
(Continued)

OTHER PUBLICATIONS

Office Action dated Jul. 5, 2022, for corresponding Taiwanese Patent Application No. 110145483, along with an English translation.
(Continued)

*Primary Examiner* — Ramsey Zacharia
(74) *Attorney, Agent, or Firm* — HAUPTMAN HAM, LLP

(57) ABSTRACT

Provided is a glass film-resin composite body which makes it possible to obtain a long-length (e.g., 500 m or more-long) glass roll. The glass roll with resin film comprises a glass film, and a resin film laminated to at least one surface of the glass film through an adhesive, wherein a creep amount a of the adhesive is 50 μm or less, as measured after applying a tensile shear load per unit area of the adhesive of 5 g/mm$^2$, to the resin film for 48 hours, in a state in which the glass film is fixed in 23° C. and 50% RH.

19 Claims, 1 Drawing Sheet

(51) Int. Cl.
    *B32B 17/10*     (2006.01)
    *B65H 18/28*     (2006.01)
    *C03B 40/033*     (2006.01)
    *C03C 17/32*     (2006.01)

(52) U.S. Cl.
    CPC ............ *C03B 40/033* (2013.01); *C03C 17/32* (2013.01); *B32B 2307/54* (2013.01); *B32B 2307/546* (2013.01); *B32B 2307/732* (2013.01); *B32B 2307/746* (2013.01)

(56) References Cited

U.S. PATENT DOCUMENTS

| | | | |
|---|---|---|---|
| 8,525,405 | B2 | 9/2013 | Kuwabara et al. |
| 8,609,229 | B2 | 12/2013 | Kondo |
| 8,806,894 | B2 | 8/2014 | Tomamoto et al. |
| 9,278,497 | B2 | 3/2016 | Mori et al. |
| 9,931,816 | B2 | 4/2018 | Tomamoto et al. |
| 11,241,863 | B2 * | 2/2022 | Murashige .............. C03C 17/32 |
| 2010/0192634 | A1 | 8/2010 | Higuchi et al. |
| 2010/0276066 | A1 | 11/2010 | Kondo |
| 2011/0023548 | A1 | 2/2011 | Garner et al. |
| 2011/0171417 | A1 | 7/2011 | Nakamura et al. |
| 2011/0177290 | A1 | 7/2011 | Tomamoto et al. |
| 2011/0177325 | A1 | 7/2011 | Tomamoto et al. |
| 2011/0177347 | A1 | 7/2011 | Tomamoto et al. |
| 2011/0192878 | A1 | 8/2011 | Teranishi et al. |
| 2012/0171454 | A1 | 7/2012 | Kondo et al. |
| 2012/0225287 | A1 | 9/2012 | Keller et al. |
| 2012/0237779 | A1 | 9/2012 | Teranishi et al. |
| 2012/0258584 | A1 | 10/2012 | Garner et al. |
| 2013/0044282 | A1 | 2/2013 | Kuwabara et al. |
| 2013/0133809 | A1 | 5/2013 | Kondo |
| 2014/0220309 | A1 | 8/2014 | Vogt et al. |
| 2014/0319001 | A1 | 10/2014 | Tomamoto et al. |
| 2015/0072125 | A1 | 3/2015 | Murashige et al. |
| 2015/0197407 | A1 | 7/2015 | Garner et al. |
| 2015/0314572 | A1 | 11/2015 | Murashige et al. |
| 2016/0016746 | A1 | 1/2016 | Teranishi et al. |
| 2017/0036876 | A1 | 2/2017 | Murashige et al. |
| 2017/0057770 | A1 | 3/2017 | Garner et al. |
| 2020/0198302 | A1 | 6/2020 | Murashige et al. |

FOREIGN PATENT DOCUMENTS

| | | |
|---|---|---|
| CN | 102089223 A | 6/2011 |
| CN | 102481764 A | 5/2012 |
| CN | 102112379 A | 1/2013 |
| CN | 102905891 A | 1/2013 |
| CN | 104220253 A | 12/2014 |
| EP | 2336050 A1 | 6/2011 |
| EP | 2548730 A1 | 1/2013 |
| FR | 2919282 A1 | 1/2009 |
| JP | S54-57581 A | 5/1979 |
| JP | 4326635 B2 | 9/2009 |
| JP | 2010-105900 A | 5/2010 |
| JP | 2010-126587 A | 6/2010 |
| JP | 2011-121320 A | 6/2011 |
| JP | 2011-207721 A | 10/2011 |
| JP | 2013-500923 A | 1/2013 |
| JP | 2013-510788 A | 3/2013 |
| JP | 2013-148687 A | 8/2013 |
| JP | 2013-212633 A | 10/2013 |
| JP | 2014-113687 A | 6/2014 |
| JP | 2014-213488 A | 11/2014 |
| JP | 2015-504397 A | 2/2015 |
| JP | 5754530 B2 | 7/2015 |
| JP | 2015-174694 A | 10/2015 |
| JP | 2015-214468 A | 12/2015 |
| TW | 200948604 A1 | 12/2009 |
| TW | 201022163 A1 | 6/2010 |
| TW | 201127620 A1 | 8/2011 |
| TW | 201129466 A1 | 9/2011 |
| TW | 201345731 A | 11/2013 |
| TW | I747978 B | 12/2021 |
| WO | 2009/093505 A1 | 7/2009 |
| WO | 2011/030716 A1 | 3/2011 |
| WO | 2014/088052 A1 | 12/2014 |
| WO | 2015/118985 A1 | 8/2015 |
| WO | 2015/174216 A1 | 11/2015 |

OTHER PUBLICATIONS

International Search Report for corresponding international application PCT/JP2017/038353 dated Dec. 12, 2017, along with an English translation.
Office Action issued for corresponding Indian Patent Application No. 201917018592 dated Feb. 12, 2020.
Extended European Search Report dated May 25, 2020 corresponding to European Patent Application No. 17864152.8.
Office Action issued for corresponding Korean Patent Application No. 10-2019-7013675 dated Aug. 26, 2020, along with an English translation.
Office Action issued for corresponding Taiwanese Patent Application No. 106136695 dated Feb. 3, 2021, along with an English translation.
Office Action issued for corresponding Chinese Patent Application No. 201780066323.2 dated May 6, 2021, along with an English machine translation.
Nitto Denko No. 5600 Product Data Sheet (Year: 2019).
Office Action issued for corresponding Japanese patent application No. 2018-547686 dated Sep. 29, 2021, along with an English machine translation.
Official Action dated Oct. 22, 2021, for corresponding Chinese Patent application No. 201780066323.2, along with an English translation.
Airuo et al., "Practical Chemistry", Shaanxi Normal University Press, Sep. 1998, pp. 119-120, Cited in NPL No. 9, along with an English translation.
Office Action dated Jan. 5, 2023 for corresponding Chinese Patent Application No. 202210367735.2, along with an English translation (14 pages).
Official Action dated Sep. 12, 2022, for European Patent Application No. 17 864 152.8 (11 pages).
Decision of Final Rejection dated Jul. 11, 2023 for corresponding Chinese Patent Application No. 202210367735.2, along with an English translation (10 pages).

* cited by examiner

GLASS ROLL WITH RESIN FILM

CROSS REFERENCE TO RELATED APPLICATION

This application is a Continuation of U.S. patent application Ser. No. 16/345,466 filed on Apr. 26, 2019, which is the National Phase of International Application No. PCT/JP2017/038353, filed on Oct. 24, 2017, which claims the priority of Japanese Patent Application No. 2016-209752 filed on Oct. 26, 2016 in the JPO (Japanese Patent Office). All of the aforementioned applications are hereby incorporated by reference in their entireties.

TECHNICAL FIELD

The present invention relates to a glass roll with resin film. In particular, the present invention relates to a glass roll with resin film which makes it possible to obtain a long-length (e.g., 500 m or more-long) glass roll.

BACKGROUND ART

Recent years, in the fields of display and illumination elements using a liquid crystal display element or an organic EL element, and of solar batteries, weight reduction and thickness reduction have been promoted from the viewpoint of transportability, storability, and designability, and development toward continuous production by a roll-to-roll process has also been promoted.

In such circumstance, as a way to give flexibility to glass to be used in the above elements, it is proposed to use an ultrathin (e.g., 200 µm or less-thick) glass (hereinafter also referred to as "glass film"). A glass film has flexibility, so that it is capable of being wound in the form of a roll, and thus processed through the roll-to-roll process. Heretofore, there have been disclosures about a method of subjecting a glass film to processing to form a polarizer, a transparent electrode or the like thereon through the roll-to-roll process, and others.

For example, U.S. Pat. No. 8,525,405B discloses a method of producing a display having a flexible glass layer, through the roll-to-roll process.

Meanwhile, it is known that a glass film is weak against tensile stress due to bending, and is liable to be cracked from an edge thereof. Therefore, many studies on glass film processing methods have been made.

For example, JP 2015-504397A discloses a technique of providing a glass film capable of maximally or completely preventing formation of a crack starting from an edge of the glass film by improving edge quality of the glass film sufficiently enough to enable inflection (bending) or wind-up of the glass film (by setting an average surface roughness of the glass film to 2 nm or less).

Further, with a view to providing a thin sheet glass roll which has a structure capable of allowing an unnecessary load to become less likely to act on a thin sheet glass of the roll, thereby reducing possibility of breakage or damage during handling to ensure safe transportation, JP 4326635B discloses a thin sheet glass roll in which a thin sheet glass is wound in the form of a roll together with a peelable resin film.

However, even with these conventional techniques, it has not yet been able to completely prevent generation of cracks.

Moreover, there remains a problem regarding roll transportation, such as a problem that, when stress is applied onto the surface of a glass film of a roll due to a bending-causing contact with respect to the roll, the glass film starts to be cracked from an edge thereof.

Therefore, there has been proposed a technique of laminating a resin film to one or each of opposite surfaces of a glass film, or to each of width-directional opposite edge regions of the glass film, to thereby prevent a crack from being generated at an edge of the glass film or to prevent development of the generated crack.

For example, with a view to providing a production method for a glass-resin composite body having sufficient transportability, handleability and processability even when glass is extremely thin, JP 5754530B discloses a technique of pressure-bonding a photo-curable resin film to a glass ribbon, and curing the photo-curable resin film by irradiation with ultraviolet light, to form a resin layer.

Further, with a view to preventing blocking between contact parts of a glass sheet, or the like, the pamphlet of WO 2015/118985 discloses a glass roll in which a resin coating film is formed on one surface of the glass sheet.

With a view to, even when a composite body obtained by bonding a resin layer to a glass sheet is subjected to bending deformation, cutting of an edge region thereof, or the like, and a crack is formed at the resulting cut edge of the glass sheet or in the vicinity of the cut edge, preventing the crack from propagating into an effective region, the pamphlet of WO 2015/174216 discloses a technique of forming a sacrificial groove outside the effective region of the glass sheet.

JP 2015-214468A discloses a technique of bonding, to a glass sheet, a resin layer having adhesive force equivalent to a 180-degree peel strength of 1 N/25 mm or more, a Young's modulus of 100 MPa or more, and a thickness of 1 to 100 µm, thereby making it possible to cut the glass sheet while suppressing propagation of a crack formed therein.

With a view to facilitating handling and conveyance of a glass ribbon, JP 2013-500923A discloses a technique of coating an edge region of the glass ribbon with a flexible material such as an existing film, wherein the resulting coating may be bonded to the glass by an adhesive.

However, as it stands, a glass film having a long length required to be highly-efficiently subjected to processing through the roll-to-roll process, e.g., a glass film having a length of 500 m or more (preferably, 1000 m or more), has not yet been distributed to the market, i.e., has not yet been realized.

Further, when reinforcing a glass film, it is necessary to give consideration to not only prevention of cracks in the glass film for a specified period of time, but also stability in a static state, e.g., in a period during which the glass film is stored in the form of a roll for a long period of time.

CITATION LIST

Patent Document

Patent Document 1: U.S. Pat. No. 8,525,405B
Patent Document 2: JP 2015-504397A
Patent Document 3: JP 4326635B
Patent Document 4: JP 5754530B
Patent Document 5: pamphlet of WO 2015/118985
Patent Document 6: pamphlet of WO 2015/174216
Patent Document 7: JP 2015-214468A
Patent Document 8: JP 2013-500923A

SUMMARY OF INVENTION

Technical Problem

It is an object of the present invention to provide a glass roll with resin film which makes it possible to obtain a long-length (e.g., 500 m or more-long) glass roll.

The present invention also proposes a glass roll with resin film which fulfills physical properties of a resin required for anti-cracking and suppression of fracture propagation related to static fatigue of glass.

Solution to Technical Problem

As a result of diligent researches for solving the above problems, the present inventors found that the above problems can be solved by a glass roll with resin film comprising a glass film and a resin film laminated to at least one surface of the glass film through an adhesive, wherein a creep amount of the adhesive is set to a given value or less, and a slip constant obtained from slipperiness between the glass film and the resin film through the adhesive and a surface stress of the glass film is set to a given valve or less, and have finally reached the present invention.

Development of a crack generated at an edge of a glass film can be prevented to some extent by reinforcing the glass film with a resin film or the like. Further, with regard to dynamic fracture, some findings have been obtained until now, in connection with the technique of suppressing development of a crack (i.e., fracture of glass) by a resin film or the like. However, from a pragmatic perspective, it is also important to be able to withstand keeping in the form of a roll for storage or the like in a course until the glass film is formed into a final product (viewpoint of static fracture).

With a focus on this static fracture, the present inventors reached a concept that a major factor causing the static fracture is plastic deformation of the adhesive (resin constituting the adhesive) lying in a boundary between the glass film and the resin film, although not limited to any specific theory. A degree of plastic deformation can be expressed as a product S of a bulk property (creep amount) of the adhesive and a stress applied to the glass film. Then, it was found that, under the condition that the product S is given value or less, the glass film can also be reinforced from the viewpoint of the static fracture.

Here, the mechanism of the static fracture behind the present invention will be briefly described. When there is a small crack at an edge of glass, and when a bending stress is applied to the glass, the stress concentrates around the crack, so that fracture occurs parallel to the bending direction. However, when a resin film is bonded through an adhesive onto a region of the glass on a leading side of development of the crack, the adhesive undergoes elastic deformation, and if energy balance is established, the development of the crack is blocked (resin reinforcement). The elastically deformed state is an act to continually apply a kinetic load to the adhesive, wherein plastic deformation of the adhesive gradually progresses at an interface with the glass. This means that the balanced state with the elastic deformation is disrupted. As a result, the crack starts to develop. This local state variation is considered to be the mechanism of the static fracture of the glass film.

Specifically, according to a first aspect of the present invention, there is provided a glass roll with resin film which comprises a glass film, and a resin film laminated to at least one surface of the glass film through an adhesive, wherein a creep amount a of the adhesive is 50 μm or less, as measured after applying a tensile shear load per unit area of the adhesive of 5 g/mm$^2$, to the resin film for 48 hours, in a state in which the glass film is fixed in 23° C. and 50% RH.

Preferably, in the glass roll with resin film according to the first aspect of the present invention, a slip constant S of the glass roll with resin film is $2 \times 10^{-16}$ or less, wherein the slip constant S is obtained from the following formula: $S \equiv \alpha \sigma$, where $\alpha$ represents a slipperiness (m$^2$/GPa/48 h) of the adhesive calculated by the following formula: $\alpha = a/F$ (where: F represents the tensile shear load per unit area of the adhesive (GPa/m) applied to the resin film; and a represents the creep amount (m) of the adhesive), and $\sigma$ represents a bending stress (GPa) of the glass film calculated by the following formula:

$$\sigma = \frac{E_g t_g}{2\rho}$$

(where: Eg represents the Young's modulus (GPa) of the glass film; tg represents the thickness (μm) of the glass film; and ρ represents a curvature radius (mm) centered at a thickness-directional center of the glass roll).

According to a second aspect of the present invention, there is provided a glass roll with resin film which comprises a glass film, and a resin film laminated to at least one surface of the glass film through an adhesive, wherein a slip constant S of the glass roll with resin film is $2 \times 10^{-16}$ or less, wherein the slip constant S is obtained from the following formula: $S \equiv \alpha \sigma$, where $\alpha$ represents a slipperiness (m$^2$/GPa/48 h) of the adhesive calculated by the following formula: $\alpha = a/F$ (where: F represents a tensile shear load per unit area of the adhesive (GPa/m) applied to the resin film, in a state in which the glass film is fixed in 23° C. and 50% RH; and a represents a creep amount (m) of the adhesive, as measured after applying the tensile shear load for 48 hours), and $\sigma$ represents a bending stress (GPa) of the glass film calculated by the following formula:

$$\sigma = \frac{E_g t_g}{2\rho}$$

(where: Eg represents the Young's modulus (GPa) of the glass film; tg represents the thickness (μm) of the glass film; and ρ represents a curvature radius (mm) centered at a thickness-directional center of the glass roll).

Preferably, in the glass roll with resin film according to the first or second aspect of the present invention, the bending stress a of the glass film is 20 GPa or more.

Preferably, in the glass roll with resin film according to the first or second aspect of the present invention, the resin film has a width 1 of 20 mm or more.

Preferably, in the glass roll with resin film according to the first or second aspect of the present invention, the thickness tg of the glass film is 20 to 200 μm.

Preferably, in the glass roll with resin film according to the first or second aspect of the present invention, a product of the Young's modulus Ep (GPa) and the thickness tp (μm) of the resin film is $100 \times 10^3$ pa·m or more.

Preferably, in the glass roll with resin film according to the first or second aspect of the present invention, the resin film is formed in a tape shape and provided by a number of at least two, wherein the at least two resin films are disposed parallel to the glass film.

Preferably, in the above glass roll with resin film, at least two of the resin tapes are laminated such that the resin tapes are provided in the vicinity of each of width-directional opposite edges of the glass film, in spaced-apart relation to each other.

Preferably, in the glass roll with resin film according to the first or second aspect of the present invention, the resin film is disposed on the glass film in at least one direction to form a laminated film, wherein the resin film is disposed on an inner surface of the glass film when the laminated film is wound into a roll.

The glass roll with resin film according to the first or second aspect of the present invention can be suitably used for producing a long-length glass roll.

Effect of Invention

The present invention makes it possible to obtain a long-length (e.g., 500 m or more-long) glass roll, and obtain a glass roll with resin film which fulfills physical properties of a resin required for anti-cracking and suppression of fracture propagation related to static fatigue of glass

DESCRIPTION OF EMBODIMENTS

Figure 1:
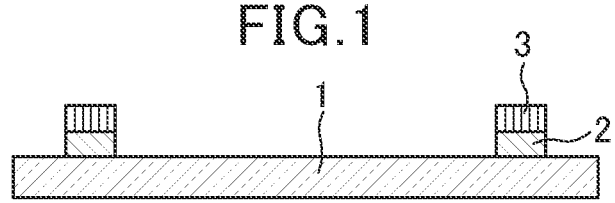
FIG. 1 is a conceptual sectional view of a glass film to which a resin film is laminated through an adhesive, in a glass roll with resin film according to one embodiment of the present invention.

With reference to FIG. 1 which is a conceptual sectional view depicting a glass film to which a resin film is laminated through an adhesive, in a glass roll with resin film according to one embodiment of the present invention, a glass roll with resin film according to the present invention will now be described. The glass roll with resin film according to the present invention comprises a glass film 1, and a resin film 3 laminated to at least one surface of the glass film 1 through an adhesive 2, In the glass roll with resin film according to the present invention, a creep amount a of the adhesive is 50 μm or less, as measured after applying a tensile shear load per unit area of the adhesive of 5 g/mm², to the resin film for 48 hours, in a state in which the glass film is fixed in 23° C. and 50% RH.

Figure 2:
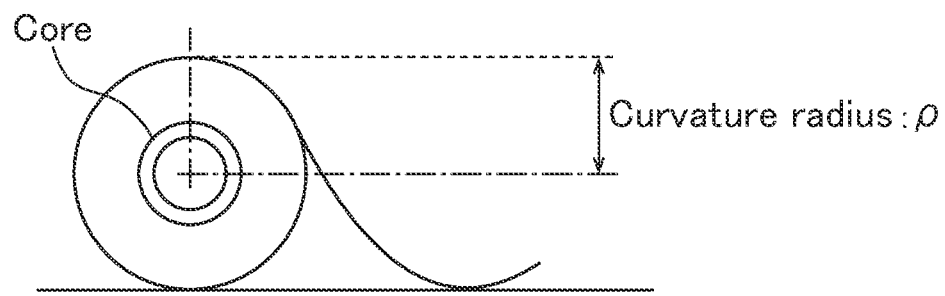
FIG. 2 is a conceptual sectional view of a glass roll with resin film according to one embodiment of the present invention.

Referring to FIG. 2 which is a conceptual sectional view depicting a glass roll with resin film according to one embodiment of the present invention, the glass roll with resin film according to the present invention will be further described.

In addition to or in place of the above property, a slip constant S of the glass roll with resin film is $2\times10^{-16}$ or less, wherein the slip constant S is obtained from the following formula: S≡ασ, where a represents a slipperiness (m²/GPa/48 h) of the adhesive calculated by the following formula: α=a/F (where: F represents a tensile shear load per unit area of the adhesive (GPa/m) applied to the resin film, in a state in which the glass film is fixed in a 23° C. and 50% RH; and a represents a creep amount (m) of the adhesive, as measured after applying the tensile shear load for 48 hours), and σ represents a bending stress (GPa) of the glass film calculated by the following formula:

$$\sigma = \frac{E_g t_g}{2\rho}$$

(where: Eg represents the Young's modulus (GPa) of the glass film; tg represents the thickness (μm) of the glass film; and ρ represents a curvature radius (mm) centered at a thickness-directional center of the glass roll).

(Glass Film)

The glass film for the glass roll with resin film according to the present invention may be produced by any suitable production method.

Examples of a forming method for the glass film include a slot down-draw process, a fusion process, and a float process. Among them, a glass film formed by the fusion process needs not be subjected to polishing, because the surface thereof is is not contaminated by tin, etc., differently from formation by the float process, and can ensure surface smoothness and thinning. From these viewpoints, it is preferable to use the fusion process.

The Young's modulus Eg (GPa) of the glass film is normally about 70 GPa, preferably 50 to 120 GPa, more preferably 60 to 80 GPa, still more preferably 65 to 75 GPa.

The thickness tg of the glass film is preferably 200 μm or less, more preferably 20 μm to 200 μm, still more preferably 20 μm to 100 μm. In the glass film obtained in the above manner, edge regions thereof are chucked during cooling, so that the glass film is likely to have a relatively thicker-walled portion (thick-walled marginal portion) at each of width-directionally opposite edges thereof. The "thickness of the glass film" means the thickness of the remaining portion other than such a thicker-walled portion. Further, the "thickness of the glass film" also means the thickness of a portion of the glass film to which the resin tape is laminated.

The width of the glass film is preferably 50 mm to 2000 mm, more preferably 100 mm to 1000 mm.

Preferably, the glass film is preferably an elongated glass ribbon. In a case where the glass film is lengthy, the length thereof is preferably 100 m or more, more preferably 500 m or more.

The bending stress of the glass film is preferably 20 GPa or more.

(Resin Film)

The resin film for the glass roll with resin film according to the present invention is formed of any suitable resin material. Examples of a resin for forming the resin film include polyethylene, polyvinyl chloride, polyethylene terephthalate, polyvinylidene chloride, polypropylene, polyvinyl alcohol, polyester, polycarbonate, polystyrene, polyacrylonitrile, an ethylene vinyl acetate copolymer, an ethylene-vinyl alcohol copolymer, an ethylene-methacrylic acid copolymer, nylon, cellophane, and a silicone resin.

The width 1 of the resin film is not particularly limited but may be set to an appropriate value. For example, the width 1 is preferably 20 mm or more.

Further, the width of the resin film is preferably 1% to 20%, more preferably 3% to 15%, with respect to the width of the glass film. Further, in a case where the resin film is configured to reinforce the entire surface of the glass film, the width of the resin film is preferably set in the range of 80% to 110%, more preferably 90% to 100%, with respect to the width of the glass film.

The Young's modulus Ep of the resin film is preferably 0.1 to 20 GPa, more preferably 0.5 to 10 GPa, still more preferably 2 to 5 GPa.

The thickness tp of the resin film is not particularly limited. For example, the thickness tp is preferably 2 μm to 200 μm, more preferably 10 μm to 150 μm, still more preferably 20 μm to 100 μm.

Preferably, a product of the Young's modulus Ep (GPa) and the thickness of the resin film is $100\times10^3$ pa·m or more.

The length of the resin film may be set to any suitable value, depending on the length of the glass film.

Figure 3:
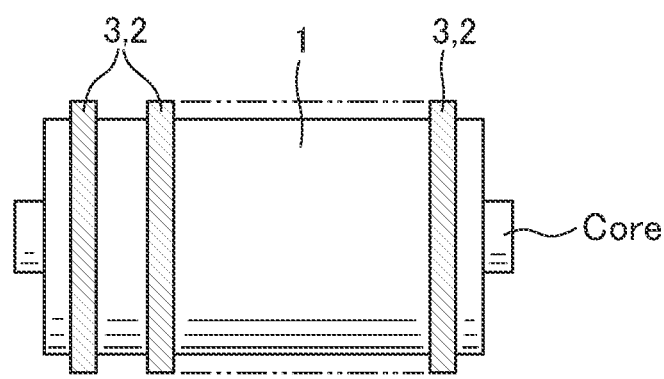
FIG. 3 is a conceptual top plan view of a glass roll with resin film according to one embodiment of the present invention.

Referring to FIG. 3 which is a conceptual top plan view depicting a glass roll with resin film according to one embodiment of the present invention, the resin film may be formed in a tape shape, and provided by a number of two or more, wherein the two or more resin films are disposed parallel to the glass film.

(Adhesive)

In the adhesive for use in laminating the resin film to the glass film in the glass roll with resin film according to the present invention, the creep amount thereof is 50 μm/N/48 h or less. Preferably, the creep amount is 40 μm/N/48 h or less.

The creep amount of the adhesive is a value as measured after applying a tensile shear load per unit area of the adhesive of 5 g/mm$^2$, to the resin film for 48 hours, in a state in which the glass film is fixed in 23° C. and 50% RH. For example, the creep amount can be measured in the following manner. The adhesive is provided between a PET film and a plate glass each having a size of 10 mm width×10 mm length) (size of a bonding surface: 10 mm×10 mm). Subsequently, the resulting sample is subjected to autoclave treatment at 50° C. and 50 atm for 15 minutes, and then left at room temperature (23° C.) for 1 hour. Subsequently, a load of 5 g/mm$^2$ is imposed on the sample (a tensile shear stress is loaded in a drooping direction), and, after the elapse of 48 hours, a slip amount (μm) in the sample is measured.

However, this method is merely one method for measuring the creep amount, and how to measure the value of the creep amount is not limited to a specific measurement method. That is, the creep amount can be deemed to be equivalent to a slip amount measured after imposing a unit load converted to 5 g/mm$^2$, between the glass film and the resin film in a shear direction for 48 hours. A pretreatment such as the autoclave treatment is intended to bring the adhesive into a state allowing the resin film-attached glass role to practically function, at an accelerated pace. Thus, it is to be understood that the resin film-attached glass role being in a practicable circumstance needs not be subjected to such a treatment. Further, in the above method, the plate glass and the PET film are used for the purpose of simplifying the measurement. However, as long as each of glass and a resin film used has an elastic deformation region under a load converted to 5 g/mm$^2$, a material of the glass and a form, such as plate or film, of the glass need not limited. The same is also applied to the PET film.

In addition to or in place of the above property, in the adhesive for used in the glass roll with resin film according to the present invention, a slip constant S of the glass roll with resin film is 2×10$^{-16}$ or less, wherein the slip constant S is obtained from the following formula: S≡ασ, where α represents a slipperiness (m$^2$/GPa/48 h) of the adhesive calculated by the following formula: α=a/F (where: F represents a tensile shear load per unit area of the adhesive (GPa/m) applied to the resin film, in a state in which the glass film is fixed in a 23° C. and 50% RH; and a represents a creep amount (m) of the adhesive, as measured after applying the tensile shear load for 48 hours), and σ represents a bending stress (GPa) of the glass film calculated by the following formula:

$$\sigma = \frac{E_g t_g}{2\rho}$$

(where: Eg represents the Young's modulus (GPa) of the glass film; tg represents the thickness (μm) of the glass film; and ρ represents a curvature radius (mm) centered at a thickness-directional center of the glass roll).

Examples of a material for forming the adhesive include an epoxy-based adhesive, an acrylic-based adhesive, a urethane-based adhesive, a rubber-based pressure-sensitive adhesive, an acrylic-based pressure-sensitive adhesive and a silicone-based pressure-sensitive adhesive and a urethane-based pressure-sensitive adhesive, and any mixture thereof. Further, a curable pressure-sensitive adhesive or adhesive may be used. The term "pressure-sensitive adhesive" here means a material whose adhesiveness is not significantly changed even after re-attached, except for a time-dependent change.

The thickness of the adhesive is preferably 1 μm to 50 μm, more preferably 10 μm to 20 μm.

(Production Method for Glass Roll with Resin Film)

As a production method for the glass roll with resin film, it is possible to use a laminate process of laminating the resin film and the glass film together while applying a constant load thereto by a rubber or iron roll being rotated. In this case, a layer of the adhesive may be preliminarily provided on the resin film or the glass film, or may be provided thereon concurrently with the lamination. Further, in order to obtain a desired adhesiveness, more specifically to promote chemical binding between materials used, energy such as light and/or heat may be added thereto.

EXAMPLES

Although the present invention will now be more specifically described by taking examples, it should be noted that the present invention is not limited to such examples.

(Preparation of Resin Film)

A PET film (Diafoil T104E100 UE07 manufactured by Mitsubishi Plastics, Inc., 4 GPa) having a length of 60 mm, a width of 20 mm and a thickness of 100 μm was prepared.

(Preparation of Glass Film)

Two types of glass films (OA10 manufactured by Nippon Electric Glass Co., Ltd., size: 100 mm×60 mm, thickness: 50 μm and 100 μm) were prepared. The Young's moduluses Ep (GPa) of the glass films were identified by a resonance method.

Preparation of Adhesive

Production Example 1

60 parts of epoxy-based monomer (CELLOXIDE 2021P manufactured by Daicel Corp.), 10 parts of epoxy-based polymer (EHPE3150 manufactured by Daicel Corp.), 20 parts of oxetane-based monomer (ARON OXETANE OXT-221 manufactured by Toagosei Co., Ltd.), 4 parts of silane coupling agent (KBM-403 manufactured by Shin-Etsu Chemical Co., Ltd.) and 2 parts of polymerization initiator (CPI101A manufactured by San-Apro Ltd.) were mixed together to prepare an ultraviolet-curable adhesive.

Production Example 2

63 parts of 2-ethylhexyl acrylate (2EHA), 15 parts of N-vinylpyrrolidone (NVP), 9 parts of methyl methacrylate (MMA), 13 parts of 2-hydroxyethyl acrylate (HEA) and 0.2 parts of 2,2'-azobisisobutyronitrile (AIBN) serving as a thermal polymerization initiator were put in a flask together with 177.8 parts of ethyl acetate serving as a polymerization solvent. Subsequently, the solution in the flask was stirred under a nitrogen atmosphere at 23° C. for 2 hours, and then subjected to reaction at 65° C. for 5 hours, followed by reaction at 50° C. for 2 hours. In this manner, a polymer solution (pressure-sensitive adhesive precursor solution) containing a polymer was obtained. This polymer solution was defined as "polymer solution (A)". In the polymer solution (A), the solid content concentration of the polymer was 36.0% (mass %), and the weight-average molecular weight of the polymer was 850,000.

A multi-functional urethane acrylate (trade name "SHI-KOH UV-7650B" manufactured by Nippon Synthetic Chemical Industry Co., Ltd., weight-average molecular weight: 2300, number of functional groups: 4 to 5, solid content concentration: 99 mass %) serving as a multi-functional acrylic oligomer was added to the polymer solution (A), in an amount of 10 mass parts with respect to 100 mass parts of the polymer in the polymer solution. Further, a photo polymerization initiator (trade name "Irgacure 184" manufactured by BASF Japan, Ltd.) was added, in an amount of 0.2 mass parts with respect to 100 mass parts of the polymer in the polymer solution. These materials were sufficiently stirred until they were dissolved. After stirring, 3-glycidoxypropyltrimethoxysilane (trade name "KBM-403" manufactured by Shin-Etsu Chemical Co., Ltd.) serving as a silane coupling agent was added to the solution, in an amount of 0.3 mass parts with respect to 100 mass parts of the polymer in the polymer solution, and further trimethylolpropane adduct of xylene diisocyanate (trade name "TAKENATE D-110N" manufactured by Mitsui Chemicals Inc., solid content concentration: 75 mass %) serving as a cross-linking agent was added, in an amount of 0.2 mass parts with respect to 100 mass parts of the polymer in the polymer solution. Then, the solution was diluted with ethyl acetate to allow the solid content concentration to become 30.0 mass %, and sufficiently stirred to obtain a pressure-sensitive adhesive composition (solvent-type pressure-sensitive adhesive composition). Then, the pressure-sensitive adhesive composition was applied to one surface of a PET film to allow a pressure-sensitive adhesive layer obtainable after drying to have a thickness (dried coated film thickness) of 50 μm, to obtain a coated layer (pressure-sensitive adhesive composition layer). Then, the coated layer was dried at 100° C. for 2 minutes to form a pressure-sensitive adhesive layer on the separator. Then, a separator (trade name "MRF38" manufactured by Mitsubishi Plastics, Inc., a release liner made of a polyethylene terephthalate and having a surface subjected to silicone-based release treatment) was attached to the surface (adhesive face) of the obtained pressure-sensitive adhesive layer to allow the release-treated surface to come into contact with the adhesive face of the pressure-sensitive adhesive layer, thereby obtaining a PET pressure-sensitive adhesive sheet having a laminate structure of PET film/pressure-sensitive adhesive/separator. Before performing the following evaluations and measurements, the double-sided pressure-sensitive adhesive sheet produced in the above manner was left within a light-shielding sheet to cover the sheet from the light, in an atmosphere at 50° C. for 24 hours.

Production Example 3

91 weight parts of butylacrylate, 6 weight parts of N-acryloylmorpholine, 2.7 weight parts of acrylic acid, 0.3 weight parts of 2-hydroxybutyl acrylate, 0.1 weight parts of 2,2'-azobisisobutyronitrile serving as a polymerization initiator and 200 weight parts of ethyl acetate were put into a flask, and the mixture was gently stirred. In this state, nitrogen gas was introduced into the flask for nitrogen substitution. Then, the solution in the flask was kept at a temperature of around 55° C. to induce polymerization reaction for 8 hours to prepare an acrylic-based polymer solution. The weight-average molecular weight of the acrylic-based polymer was 2,200,000. 0.2 weight parts of polyisocyanate-based cross-linking agent (trade name: "CORONATE L" manufactured by Nippon Polyurethane Industry Co., Ltd.,) comprising trimethylolpropane adduct of tolylene diisocyanate and serving as a cross-linking agent was added with respect to 100 weight parts of a solid content of the acrylic-based polymer solution to prepare an acrylic-based pressure-sensitive adhesive solution.

Production Example 4

100 weight parts of butylacrylate, 5 weight parts of acrylic acid, 0.075 weight parts of 2-hydroxybutyl acrylate, 0.2 weight parts of 2,2'-azobisisobutyronitrile serving as a polymerization initiator and 200 weight parts of ethyl acetate serving as a polymerization solvent were put into a flask, and nitrogen substitution was sufficiently performed. Then, the solution in the flask was kept at a temperature of around 55° C. while being steered under a nitrogen stream, to induce polymerization reaction for 10 hours to prepare an acrylic-based polymer solution. The weight-average molecular weight of the acrylic-based polymer was 2,200,000. 0.2 weight parts of dibenzoyl peroxide (NYPER BMT manufactured by Nippon Oil & Fats Co., Ltd.,) serving as peroxide, 0.1 weight % of adduct of trimethylolpropane and tolylene diisocyanate (trade name: "CORONATE L" manufactured by Nippon Polyurethane Industry Co., Ltd.,) serving as an isocyanate-based cross-linking agent, and 0.075 weight parts of silane coupling agent (KBM-403 manufactured by Shin-Etsu Chemical Co., Ltd.) were added with respect to 100 parts of a solid content of the acrylic-based polymer solution, and mixed and stirred homogeneously to prepare an acrylic-based pressure-sensitive adhesive solution (solid content: 10.9 weight %).

Production Example 5

An uncured adhesive was prepared in the same manner as that in Production Example 2.

Inventive Examples 1 to 5

Production of Glass Roll with Resin Film Test Piece

Inventive Example 1

The adhesive in Production Example 1 was applied onto one surface of a PET film using a wire bar to have a thickness of 5 μm, and the PET film was attached, through the adhesive, to a central region of one surface of a thin glass having a thickness of 100 μm, in such a manner as to allow long sides of the PET film to become parallel to long sides of the glass. Then, the resulting laminate was irradiated with ultraviolet light (wavelength: 365 nm, intensity: 1000 mj/cm$^2$ or more) from a high-pressure mercury lamp to cure the adhesive, thereby producing a resin film-attached glass film test piece.

Inventive Example 2

The separator of the laminate of the PET film/the pressure-sensitive adhesive in Production Example 2/the separator were removed, and the PET film was attached, through the pressure-sensitive adhesive, to a central region of a thin glass having a thickness of 50 μm, in such a manner as to allow long sides of the PET film to become parallel to long sides of the glass. Then, the resulting laminate was irradiated with ultraviolet light (wavelength: 365 nm, intensity: 3000 mj/cm$^2$ or more) from a high-pressure mercury lamp to cure the adhesive, thereby producing a resin film-attached glass film test piece.

Inventive Example 3

The adhesive in Production Example 3 was applied onto one surface of a PET film to have a thickness of 5 μm, and the PET film was attached, through the adhesive, to a central region of one surface of a thin glass having a thickness of 50 μm, in such a manner as to allow long sides of the PET film to become parallel to long sides of the glass, thereby producing a resin film-attached glass film test piece.

Inventive Example 4

The pressure-sensitive adhesive solution in Production Example 4 was applied onto one surface of a PET film, in such a manner as to allow a pressure-sensitive adhesive obtainable after drying to have a thickness of 22 μm, and then dried at 150° C. for 3 minutes to form a pressure-sensitive adhesive. The pressure-sensitive adhesive was attached to a central region of one surface of a thin glass having a thickness of 50 μm, in such a manner as to allow long sides of the PET film to become parallel to long sides of the glass, thereby producing a resin film-attached glass film test piece.

Inventive Example 5

The uncured adhesive in Production Example 5 applied onto one surface of a PET film was attached, through the adhesive, to a central region of one surface of a thin glass having a thickness of 100 μm, in such a manner as to allow long sides of the PET film to become parallel to long sides of the glass. Then, the resulting laminate was irradiated with ultraviolet light (wavelength: 365 nm, intensity: 1000 mj/cm$^2$ or more) from a high-pressure mercury lamp to cure the adhesive, thereby producing a resin film-attached glass film test piece.

(Evaluation of Reinforcement Effect of Resin Film-Attached Glass Film Test Piece)

With regard to the produced resin film-attached glass film test pieces, a glass film reinforcement effect of the glass-reinforcing resin film was evaluated in the following manner.

Considering commercial practicality, rolls having a core diameter of widely-distributed rolls and respective outer diameters of 75 mm and 35 mm were selected. Then, the resin film-attached glass film test piece were place on and along a curved surface of each of the rolls, in a posture where the glass-reinforcing resin film faced outwardly, and opposite ends of short edges of the test piece was fixed to the curved surface by a tape. In this state, a small crack was formed at the middle of a long-side edge of the glass film by a protruding member. Thus, glass fracture propagation occurs toward the glass-reinforcing resin film in a direction perpendicular to the direction of curvature of the glass film. Then, after the elapse of 48 hours, it was visually evaluated whether the fracture propagation is promoted such that the crack in the glass plate penetrates through the glass-reinforcing resin film, or is halted within the tape. The time period "48 hours" was set as a minimum storage time period necessary to transfer to each process.

Comparative Examples 1 to 3

Except that a pressure-sensitive adhesive (No. 5600 manufactured by NITTO DENKO CORPORATION, resin film-attached glass film test pieces were produced in the same manner as those in Inventive Examples, and subjected to the evaluation of the reinforcement effect.

The resin film-attached glass film test pieces obtained in Inventive and Comparative Examples, and measurement values and evaluation results of the test pieces, obtained in Inventive and Comparative Examples are presented in Table 1.

TABLE 1

| | Creep Amount (μm/48h) | Thickness of Resin film (μm) | Thickness of Glass Film (μm) | Radius of Roll (mm) | Elastic Modulus of Glass (Gpa) | Surface Stress of Glass Pa (σ) | α (Slipperiness) (m/GPa/48h) | S(α*σ) | Evaluation Result |
|---|---|---|---|---|---|---|---|---|---|
| Inventive Example 1 | −0.60 | 100 | 100 | 75 | 72 | 48 | −1.20E − 11 | −5.74E − 19 | ○ |
| Inventive Example 2 | 5 | 100 | 50 | 35 | 72 | 24 | 1.00E − 10 | 2.40E − 18 | ○ |
| Inventive Example 3 | 20 | 100 | 50 | 75 | 72 | 24 | 4.00E − 10 | 9.60E − 18 | ○ |
| Inventive Example 4 | 39 | 100 | 50 | 75 | 72 | 24 | 7.80E − 10 | 1.87E − 17 | ○ |
| Inventive Example 5 | 5 | 100 | 100 | 75 | 72 | 48 | 1.00E − 10 | 4.80E − 18 | ○ |
| Comparative Example 1 | 730 | 100 | 50 | 75 | 72 | 24 | 1.46E − 08 | 3.50E − 16 | x |
| Comparative Example 2 | 730 | 100 | 50 | 35 | 72 | 24 | 1.46E − 08 | 3.50E − 16 | x |
| Comparative Example 3 | 730 | 100 | 100 | 75 | 72 | 48 | 1.46E − 08 | 7.01E − 16 | x |

As is evident from the above results, the present invention makes it possible to obtain a long-length (e.g., 500 m or more-long) glass roll capable of enabling fracture propagation starting from a crack formed in an edge of the glass film to be halted within the resin film, and fulfilling physical properties of a resin required for anti-cracking and suppression of fracture propagation related to static fatigue of glass.

The invention claimed is:

1. A glass roll with resin film, comprising:
a glass film, and
a resin film laminated to at least one surface of the glass film through an adhesive, wherein
the adhesive has a thickness of 1 μm to 50 μm, and
a creep amount a of the adhesive is 50 μm or less, as measured after applying a tensile shear load per unit area of the adhesive of 5 g/mm$^2$, to the resin film for 48 hours, in a state in which the glass film is fixed in 23° C. and 50% RH.

2. The glass roll with resin film as recited in claim 1, wherein a slip constant S of the glass roll with resin film is $2 \times 10^{-16}$ or less, wherein the slip constant S is obtained from the following formula: S≡ασ, where
α represents a slipperiness (m$^2$/GPa/48 h) of the adhesive calculated by the following formula: α=a/F (where: F represents the tensile shear load per unit area of the adhesive (GPa/m) applied to the resin film; and a represents the creep amount (m) of the adhesive), and
σ represents a bending stress (GPa) of the glass film calculated by the following formula:

$$\sigma = \frac{E_g t_g}{2\rho}$$

(where: Eg represents the Young's modulus (GPa) of the glass film; tg represents the thickness (μm) of the glass film; and ρ represents a curvature radius (mm) centered at a thickness-directional center of the glass roll).

3. The glass roll with resin film as recited in claim 1, wherein the bending stress a of the glass film is 20 GPa or more.

4. The glass roll with resin film as recited in claim 1, wherein the resin film has a width 1 of 20 mm or more.

5. The glass roll with resin film as recited in claim 1, wherein the thickness tg of the glass film is 20 to 200 μm.

6. The glass roll with resin film as recited in claim 1, wherein a product of the Young's modulus Ep (GPa) and the thickness tp (μm) of the resin film is $100 \times 10^3$ pa·m or more.

7. The glass roll with resin film as recited in claim 1, wherein the resin film is formed in a tape shape and provided by a number of at least two, wherein the at least two resin films are disposed parallel to the glass film.

8. The glass roll with resin film as recited in claim 7, wherein at least two of the resin tapes are laminated such that the resin tapes are provided in the vicinity of each of width-directional opposite edges of the glass film, in spaced-apart relation to each other.

9. The glass roll with resin film as recited in claim 1, wherein the resin film is disposed on the glass film in at least one direction to form a laminated film, wherein the resin film is disposed on an inner surface of the glass film when the laminated film is wound into a roll.

10. The glass roll with resin film as recited in claim 1 which is used for glass roll having a length of 100 meters or more.

11. The glass roll with resin film as recited in claim 1, wherein the thickness of the adhesive is 10 μm to 20 μm.

12. The glass roll with resin film as recited in claim 1, wherein the thickness of the adhesive is 5% to 50% of a thickness of the resin film.

13. The glass roll with resin film as recited in claim 1, wherein the thickness of the adhesive is 5% to 100% of a thickness of the glass film.

14. The glass roll with resin film as recited in claim 13, wherein the thickness of the adhesive is 5% to 50% of a thickness of the resin film.

15. The glass roll with resin film as recited in claim 1, wherein the creep amount a of the adhesive is 40 μm or less.

16. A glass roll with resin film, comprising:
a glass film, and
a resin film laminated to at least one surface of the glass film through an adhesive, wherein
the adhesive has a thickness of 1 μm to 50 μm, and
a slip constant S of the glass roll with resin film is $2 \times 10^{-16}$ or less, wherein the slip constant S is obtained from the following formula: S≡ασ, where
α represents a slipperiness (m$^2$/GPa/48 h) of the adhesive calculated by the following formula: α=a/F (where: F represents a tensile shear load per unit area of the adhesive (GPa/m) applied to the resin film, in a state in which the glass film is fixed in 23° C. and 50% RH; and a represents a creep amount (m) of the adhesive, as measured after applying the tensile shear load for 48 hours), and
σ represents a bending stress (GPa) of the glass film calculated by the following formula:

$$\sigma = \frac{E_g t_g}{2\rho}$$

(where: Eg represents the Young's modulus (GPa) of the glass film; tg represents the thickness (μm) of the glass film; and ρ represents a curvature radius (mm) centered at a thickness-directional center of the glass roll).

17. The glass roll with resin film as recited in claim 16, wherein the adhesive has a thickness of 10 μm to 20 μm.

18. The glass roll with resin film as recited in claim 16, wherein the thickness of the adhesive is 5% to 50% of a thickness of the resin film.

19. The glass roll with resin film as recited in claim 16, wherein the thickness of the adhesive is 5% to 100% of the thickness of the glass film.

\* \* \* \* \*